(12) United States Patent
Avila et al.

(10) Patent No.: US 10,764,753 B2
(45) Date of Patent: Sep. 1, 2020

(54) FLIGHT CREW CONNECTIVITY SYSTEMS AND METHODS

(71) Applicant: The Boeing Company, Chicago, IL (US)

(72) Inventors: Steven J. Avila, Renton, WA (US); Antonio Sanchez, Bothell, WA (US); John P. Baron, Bothell, WA (US); Daniel J. Ellis, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 203 days.

(21) Appl. No.: 15/717,731

(22) Filed: Sep. 27, 2017

(65) Prior Publication Data

US 2019/0098506 A1 Mar. 28, 2019

(51) Int. Cl.
*H04W 12/08* (2009.01)
*H04B 7/185* (2006.01)
(Continued)

(52) U.S. Cl.
CPC ........ *H04W 12/08* (2013.01); *H04B 7/18506* (2013.01); *H04L 63/105* (2013.01);
(Continued)

(58) Field of Classification Search
CPC ... G11B 5/09; G05F 1/70; H04N 7/18; G05D 3/121; H01H 35/00; H04W 12/08; H04B 7/18506; H04L 63/105; H04L 37/18506
See application file for complete search history.

(56) References Cited

U.S. PATENT DOCUMENTS

| | | | |
|---|---|---|---|
| 5,123,112 A * | 6/1992 | Choate .................. | H04B 7/185 370/329 |
| 7,725,610 B2 * | 5/2010 | Hosokawa ......... | H04N 21/4223 348/207.1 |

(Continued)

FOREIGN PATENT DOCUMENTS

| EP | 2945244 | 11/2015 |
|---|---|---|
| EP | 3154151 | 4/2017 |

OTHER PUBLICATIONS

"Aerospace—Connectivity & Data Management", Astronautics Corporation of America, 3 pages [online], [retrieved on Jun. 30, 2017]. Retrieved from the Internet <URL:http://astronautics.com/technology/aerospace/>.

(Continued)

*Primary Examiner* — Thanhnga B Truong
(74) *Attorney, Agent, or Firm* — Haynes and Boone, LLP

(57) ABSTRACT

Systems and methods according to one or more embodiments are provided for an aircraft flight crew secure communication path to multiple aircraft data domains. In one example, a system includes one or more data interface devices configured to communicate data. A power module is configured to provide power to the one or more data interface devices, and a switch coupled between the power module and each of the one or more data interface devices is configured to selectively provide power from the power module to at least one of the one or more data interface devices. A data transceiver is configured to couple to an external communication device, and a controller coupled between the one or more data interface devices and the data transceiver is configured to provide a data communication path between the selectively powered data interface device and the data transceiver for the external communication device.

20 Claims, 7 Drawing Sheets

(51) Int. Cl.
  *H04L 29/06* (2006.01)
  *H04L 29/08* (2006.01)
  *H02J 13/00* (2006.01)
  *H02J 3/00* (2006.01)

(52) U.S. Cl.
  CPC ............. *H02J 3/00* (2013.01); *H02J 13/00* (2013.01); *H04L 67/12* (2013.01)

(56) References Cited

U.S. PATENT DOCUMENTS

| | | | | |
|---|---|---|---|---|
| 7,804,280 | B2* | 9/2010 | Deaver, Sr. ............ | H02J 3/1828 323/210 |
| 7,908,042 | B2 | 3/2011 | Brinkley et al. | |
| 8,493,906 | B1 | 7/2013 | Troxel et al. | |
| 8,649,785 | B2 | 2/2014 | Durand et al. | |
| 8,676,393 | B1* | 3/2014 | Hupton ................ | H02J 3/14 700/295 |
| 9,334,063 | B2 | 5/2016 | Baumgarten et al. | |
| 2010/0105329 | A1 | 4/2010 | Durand et al. | |

OTHER PUBLICATIONS

Products & Solutions, "Aircraft Interface Devices (AID)—Overview", Astronics Corporation, 2 pages [online], [retrieved on Jun. 30, 2017]. Retrieved from the Internet <URL:https://www.astronics.com/product?productgroup=Avionics%20Interface%20Solutions&subproduct=aircraft%20interface%20devices%20(aid)>.

GroundLink® AID +, "Maximize your Crew's Intelligence—Activate your cockpit connectivity and enhance your flight performance", Teledyne Controls Everywhereyoulook, 1 page [online], [retrieved on Jun. 30, 2017]. Retrieved from the Internet <URL:http://www.teledynecontrols.com/products/data-solutions/aidplus>.

GroundLink® AID +, "GroundLink AID+ enhances EFB systems functionality by connecting innovative apps with onboard data—Better Decisions", Teledyne Controls Everywhereyoulook, 1 page [online], [retrieved on Jun. 30, 2017]. Retrieved from the Internet <URL:http://www.teledynecontrols.com/products/data-solutions/aidplus>.

"avRDC=AID + QAR + WiFi + 3G/4G + ADL The World's Lightest & Most Robust", avionica, 4 pages [online], [retrieved on Jun. 30, 2017]. Retrieved from the Internet <URL:https://www.avionica.com/index.php/airborne-products/avrdc-aid>.

* cited by examiner

FLIGHT CREW CONNECTIVITY SYSTEMS AND METHODS

TECHNICAL FIELD

One or more embodiments relate generally to aircraft systems, and more particularly, for example, to secure flight crew communication connectivity.

BACKGROUND

In the field of aircraft flight crew secure communication, there is an ongoing effort to improve flight crew access to multiple levels of network communication security within the aircraft flight deck. For example, different data domains on an aircraft require different levels of network access security and existing solutions that provide secure network access require complex, multiunit systems to meet network security demands. Thus, there is a need to provide improved access to multiple secure and unsecure data domains by the flight crew within an aircraft flight deck.

SUMMARY

Systems and methods are disclosed herein in accordance with one or more embodiments that provide flight crew connectivity to multiple data domains within an aircraft flight deck. In various embodiments, at least one of one or more data interface devices, each coupled to a different data domain, is selectively powered and a dedicated data communication path is formed between the powered data interface device and a data transceiver for communication with a flight crew communication device. Communication is possible with only the data domain coupled to the selectively powered data interface device. Network security is provided in that other data domains coupled to unpowered data interface devices are not capable of communication on the data communication path.

In one example, a first data interface device is coupled to avionics equipment where the avionics equipment provides aircraft control and aircraft information data. The selectively first powered data interface device provides for physically isolating the aircraft control and aircraft information data on the data communication path between the powered first data interface device and the data transceiver for communication with the flight crew communication device.

In another example, a second data interface device is coupled to non-avionics equipment where the non-avionics equipment provides passenger information and entertainment data. The selectively second powered data interface device provides for physically isolating the passenger information and entertainment data, and broadband internee access on the data communication path between the powered second data interface device and the data transceiver for communication with the flight crew communication device.

In one embodiment, a system includes one or more data interface devices configured to communicate data; a power module configured to provide power to the one or more data interface devices; a switch coupled between the power module and each of the one or more data interface devices and configured to selectively provide power from the power module to at least one of the one or more data interface devices; a data transceiver configured to couple to an external communication device; and a controller coupled between the one or more data interface devices and the data transceiver and configured to provide a data communication path between the selectively powered data interface device and the data transceiver for the external communication device.

In another embodiment, a method includes selectively switching power from a power module to at least one of one or more data interface devices to selectively power the at least one data interface device; forming a data communication path between the selectively powered data interface device and a data transceiver; and communicating data between the at least one selectively powered data interface device and the data transceiver for an external communication device.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

DETAILED DESCRIPTION

Systems and methods are provided in accordance with one or more embodiments that provides for a flight crew personal electronic device with a secure wireless data communication connection to various data domains integrated within an aircraft. In this regard, a flight crew connectivity system provides for the flight crew personal electronic device to seamlessly connect to various aircraft data domains with differing levels of network access security without compromising security level requirements.

Figure 1:
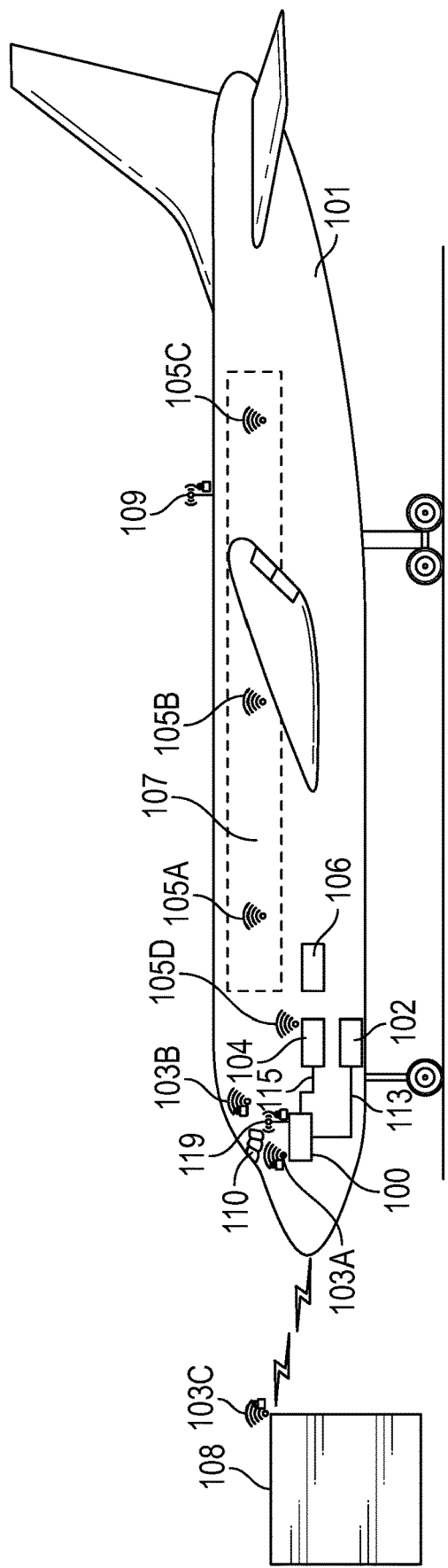
FIG. 1 illustrates a diagram of an aircraft including various aircraft data domains and network interfaces, along with a flight crew connectivity system, in accordance with one or more embodiments of the disclosure.

FIG. 1 illustrates a diagram of an aircraft 101 including a flight crew connectivity system 100, various aircraft data domains, multiple aircraft network interfaces, and aircraft equipment connected to the network interfaces in accordance with one or more embodiments of the disclosure. Flight crew connectivity system 100 provides for a secure wireless data communication path between a flight deck 110 of aircraft 101 and various wired and wireless network protocols both onboard and outside of aircraft 101. For example, flight crew connectivity system 100 communicates with avionics equipment 102 onboard aircraft 101 through wired communication interface 113, preferably via a secure aircraft protocol data bus such as ARINC 429 or ARINC 717. In some embodiments, flight crew connectivity system 100 communicates with non-avionics equipment 104 through an Ethernet interface 115. In various embodiments, flight crew connectivity system 100 wirelessly and securely connects components of avionics equipment 102 and non-avionics equipment 104 with flight deck 110 via a secure wireless Wi-Fi network 103A-C. In some embodiments, wireless Wi-Fi network 103A-C is a dedicated and secure IEEE 802.11 service set identifier (SSID) airline proprietary login for flight crew personal electronic device use (e.g., such as flight crew personal electronic device 203 of FIG. 2) within flight deck 110. Aircraft 101 includes an aircraft power module 106 (e.g., power source) to provide power to flight crew connectivity system 100.

In some embodiments, flight crew connectivity system 100 is in wireless communication with ground electronics 108 to provide for secure wireless communications between ground electronics 108 and flight deck 110. In some embodiments, ground electronics 108 wirelessly interfaces to aircraft 101 through airline proprietary secure IEEE 802.11 wireless network connection 103C, however other wireless network interfaces are possible, such as an airline proprietary secure IEEE WiMAX 802.16 wireless network connection. Flight crew personnel may download predictive maintenance reports, and other data reports pertaining to aircraft 101 onto flight crew personal electronic device 203 from ground electronics 108, for example. In some embodiments, flight crew connectivity system 100 provides for a second secure wireless network 119 for secure communication between personal electronic device 203 and an external cellular device (e.g., such as external cellular device 237A of FIG. 2).

In various embodiments, avionics equipment 102 includes electronics for an aircraft information system and an aircraft control system. In some embodiments, electronics and circuitry for avionics equipment 102 is distributed throughout aircraft 101. In some embodiments, avionics equipment 102 provides for flight information and aircraft control data. In various embodiments, non-avionics equipment 104 includes electronics for passenger information systems and electronics and networks to interface to passenger personal electronic devices. In some embodiments, non-avionics equipment 104 provides for aircraft maintenance data, aircraft operational performance data and other less secure flight crew applications.

Aircraft 101 includes multiple connectivity protocols for connecting components of avionics equipment 102 and non-avionic equipment 104. In some embodiments, components of non-avionics equipment 104 utilize a Wi-Fi communication network 105A-D to provide passengers within aircraft cabin 107 with broadband internet access. Passengers wirelessly connect their personal electronic devices (e.g., smartphones, tablets, laptop computers, for example) to the broadband internet through a broadband Ku/Ka band SATCOM antenna 109. Flight crew connectivity system 100 provides for a secure data link between Wi-Fi communication network 105A-D and flight deck 110 for flight crew personal electronic device 203 to access broadband internet without compromising high level security requirements of aircraft 101 avionics equipment 102, as discussed herein.

Figure 2:
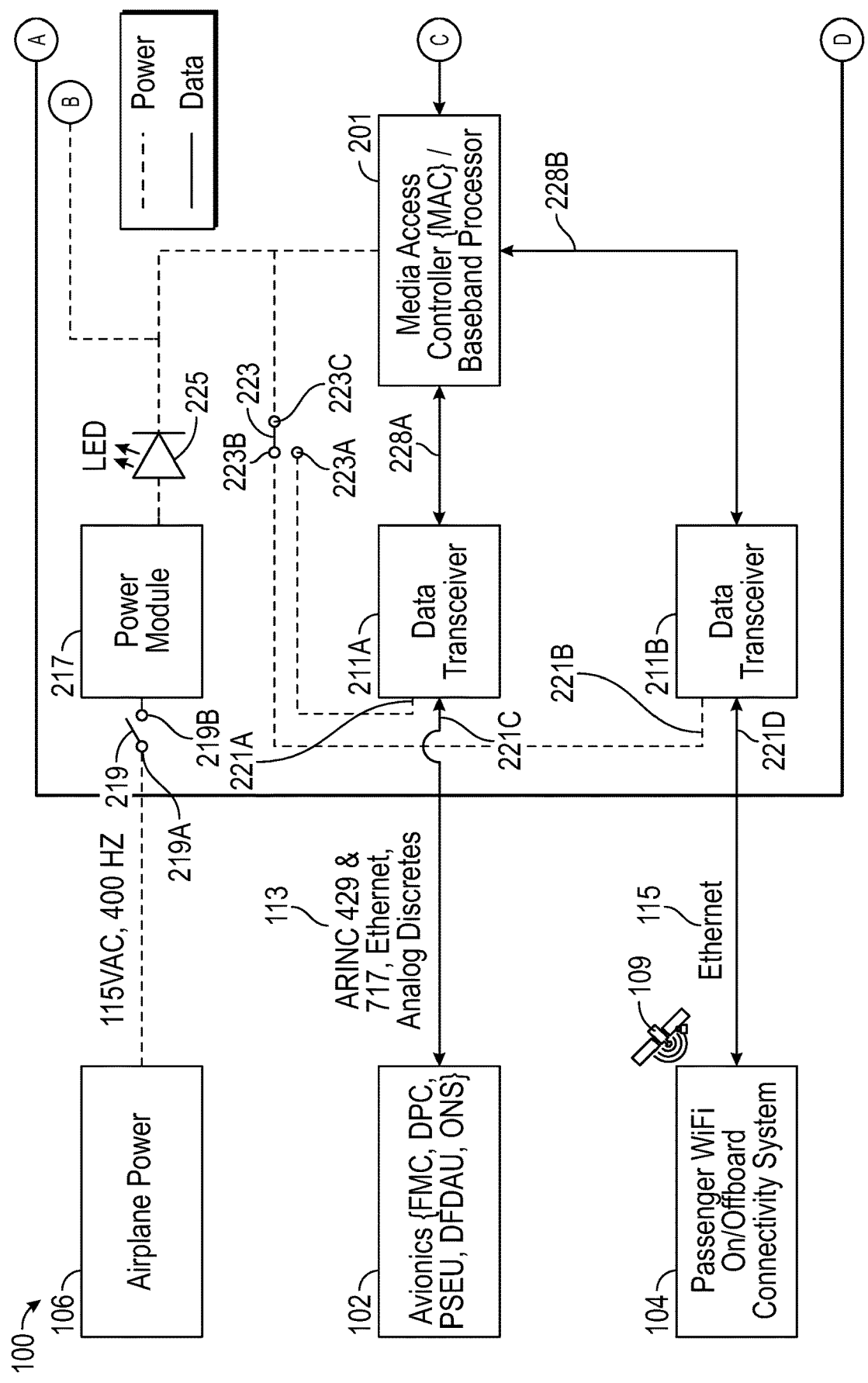
FIG. 2 illustrates a block diagram of a flight crew connectivity system in accordance with an embodiment of the disclosure.
Figure 2:
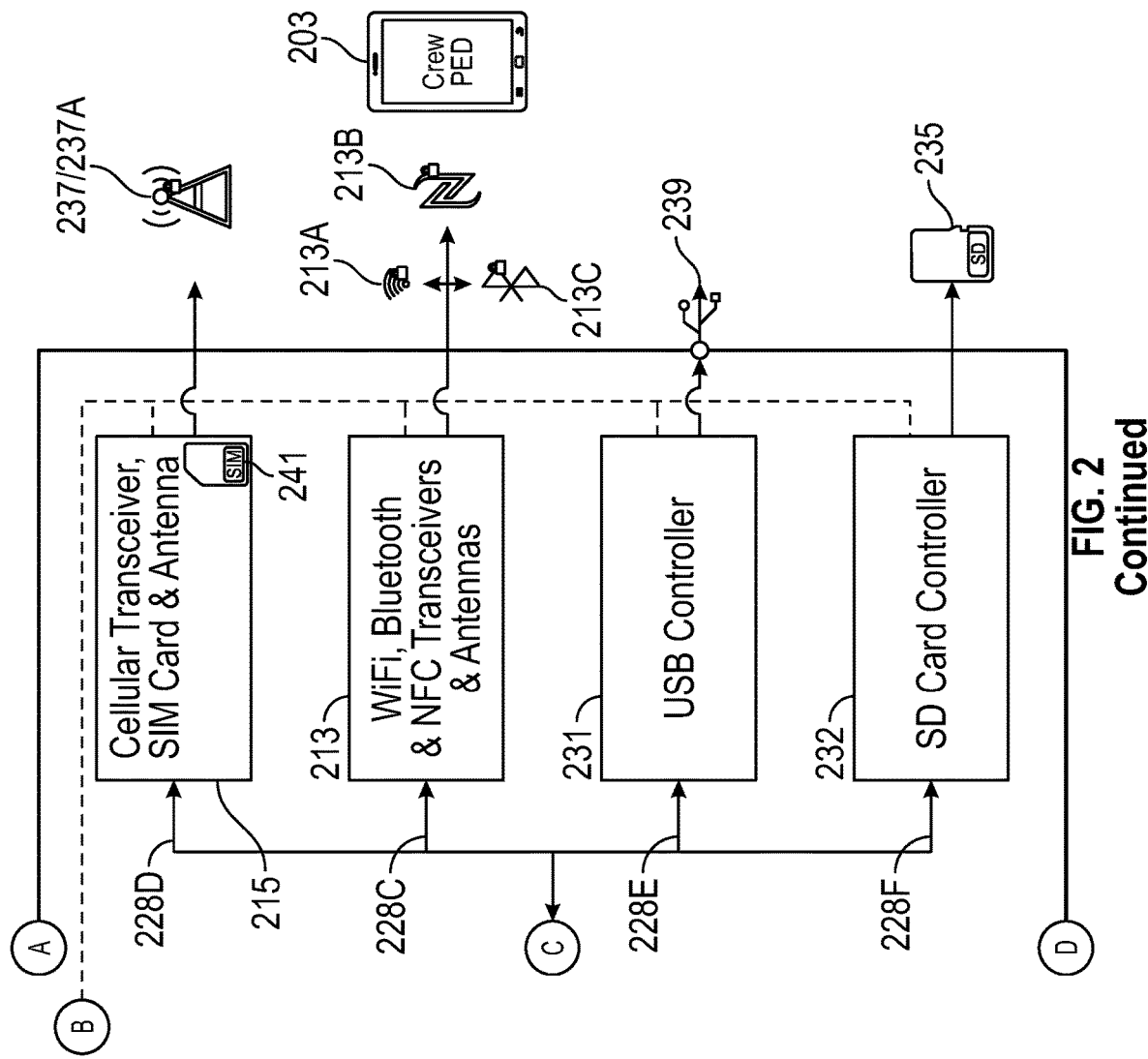

FIG. 2 illustrates a block diagram of a flight crew connectivity system 100 in accordance with an embodiment of the disclosure. Flight crew connectivity system 100 includes a controller 201 (e.g., a media access controller (MAC)/baseband processor), input data transceivers 211A-B (e.g., data interface devices), a wireless data transceiver 213 (e.g., a data transceiver, such as Wi-Fi, Bluetooth and NFC transceivers and antennas), a power module 217, and a domain switch 223.

Flight crew connectivity system 100 includes a power switch 219 (e.g., power source switch) connected to aircraft power module 106. In some embodiments, power switch 219 is implemented as a single-pole, single-throw power switch connected to aircraft power module 106 at a first terminal 219A and power module 217 at a second terminal 219B. In some embodiments, power switch 219 is manually controlled at a display panel (e.g., such as display panel 500 of FIG. 5) to provide 115 volts AC, 400 Hz to power module 217 connected to terminal 219B. However, in other embodiments, other aircraft power module 106 voltages and frequencies are possible. In other embodiments, power switch 219 is a solid-state switch electrically controlled by an electrical signal provided at display panel 500. In some embodiments, an indicator 225 is installed on display panel, and is implemented as a light emitting diode (LED). Indicator 225 is illuminated when power module 217 is powered on and providing power. In other embodiments, indicator 225 is implemented as an audible signal or other type of indicator to inform an operator that power module 217 is providing power. In some embodiments, power module 217 provides power directly to controller 201, wireless data transceiver 213, a cellular transceiver 215 (e.g., cellular transceiver, SIM card and antenna), a Universal Serial Bus (USB) controller 231, and a secure digital (SD) card controller 232.

In various embodiments, power module 217 provides power to domain switch 223. Domain switch 223 is implemented as a single-pole, double-throw switch where an input terminal 223C is connected to power module 217. A first output terminal 223A is connected to a first input data transceiver 211A (e.g., a first data interface device) at input connection 221A to provide power to first input data transceiver 211A. A second output terminal 223B is connected to a second input data transceiver 211B (e.g., a second data interface device) at input connection 221B to provide power to second input data transceiver 211B. In other embodiments, domain switch 223 includes fewer or more output terminals connected to fewer or more input data transceivers 211. In yet another embodiment, domain switch 223 is implemented as a solid-state switch controlled by electrical 2Q signals provided at display panel 500. The configuration of domain switch 223 (e.g., single-pole, double-throw) prevents first input data transceiver 211A and second input data transceiver 211B from being powered on at the same time in order to provide for a physical isolation of data communicated from first input data transceiver 211A and second input data transceiver 211B on data buses 228A-F First input data transceiver 211A is connected to avionics equipment 102 by wired communication interface 113 and data bus 2210. In some embodiments, data bus 221C is implemented as an aircraft proprietary ARINC 429 data bus to complement wired communication interface 113. In other embodiments, data bus 221C is implemented as an aircraft proprietary ARINC 717 data bus to complement wired communication interface 113. In yet another embodiment, data bus 221C is implemented as an Ethernet data bus to complement wired communication interface 113. In still another embodiment, data bus 221C is implemented as analog discrete signals to complement wired communication interface 113. In some embodiments, components of avionics equipment 102 share one or more types of wired communication interface 113 implementations. In some embodiments, components of avionics equipment 102 include a flight management computer, a display processor computer, a proximity sensor electronics unit, a flight data acquisition unit, and an on-board network system. In other embodiments, fewer or more aircraft units are included in avionics equipment 102.

In some embodiments, second input data transceiver 211B is connected to non-avionics equipment 104 (e.g., passenger Wi-Fi on/offboard connectivity system) by Ethernet interface 115 and data bus 221D implemented as an Ethernet data bus to complement Ethernet interface 115. In some embodiments, various components of non-avionics equipment 104 share Ethernet interface 115. In some embodiments, non-avionics equipment 104 includes components of a passenger information and entertainment system including an on-board Wi-Fi network 105A-D (see FIG. 1) to provide broadband internet connectivity for passenger personal electronic devices (e.g., smartphones, tablets, laptop computers, etc.) through broadband Ku/Ka band SATCOM antenna 109, for example.

Flight crew connectivity system 100 provides the ability for a secure data connection to aircraft information systems (e.g., as part of avionics equipment 102), while also being able to provide a broadband internet connection via non-avionics equipment 104 over a common data communication path. This is due to domain switch 223, which provides physical power isolation for avionics equipment 102 and non-avionics equipment 104 when input data transceiver 211A or input data transceiver 211B are selectively powered on. For example, when domain switch 223 is controlled to power-on first input data transceiver 211A, first input data transceiver 211A communicates with avionics equipment 102 to securely receive aircraft control and aircraft information data. First input data transceiver 211A provides aircraft control and aircraft information data to controller 201 over data bus 228A.

In some embodiments, controller 201 is implemented to provide a data communication path between powered first input data transceiver 211A and wireless data transceiver 213 over data buses 228A and 228C. In other embodiments, controller 201 is implemented to provide a data communication path between powered first input data transceiver 211A and USB controller 231 over data buses 228A and 228E.

In some embodiments, when domain switch 223 is controlled to power on second input data transceiver 211B, second input data transceiver 211B communicates with non-avionics equipment 104 to receive passenger information and entertainment data. Second input data transceiver 211B provides passenger information and entertainment data to controller 201 over data bus 228B.

In some embodiments, controller 201 is implemented to provide a data communication path between powered second input data transceiver 211B and wireless data transceiver 213 over data buses 228B and 228C. In other embodiments, controller 201 is implemented to provide a data communication path between powered second input data transceiver 211B and USB controller 231 over data buses 228B and 228E.

Aircraft control and aircraft information data is physically isolated on data communication path 228A/228C and 228A/228E when first input data transceiver 211A device is powered on and second input data transceiver 211B is unpowered. In addition, broadband internet access and/or passenger information and entertainment data is physically isolated on data communication path 228B/228C and 228B/228E when second input data transceiver 211B is powered on and first input data transceiver 211A is unpowered. In some embodiments, controller 201 is configured to identify the selectively powered input data transceiver 211A/211B and communicate the identification to the personal electronic device 203 (e.g., external communication device). In various embodiments, a security level of the personal electronic device 203 comprises a single or multi-layered level of security such as biometrics, pin, security badge, or other similar security features and controller 201 is configured to validate the security level of personal electronic device 203 (e.g., external communication device).

In one embodiment, wireless data transceiver 213 is implemented with a secure Wi-Fi wireless network interface 213A to communicate between flight crew connectivity system 100 and flight crew personal electronic device 203. However, other secure wireless communication network interfaces are possible, such as a secure near-field wireless communication protocol 213B and/or a secure Bluetooth wireless communication protocol 213C, or other secure wireless communication interfaces. In one embodiment, flight crew personal electronic device 203 is a wireless smart device, such as a tablet computer, a cellular device or other portable smart device capable of secure wireless communication. Flight crew connectivity system 100 includes a dedicated and secure IEEE 802.11 service set identifier for airline proprietary login for flight crew use only.

In one embodiment, USB controller 231 provides for a wired universal serial bus interface between controller 201 and personal electronic device 203. For example, USB controller 231 is connected to controller 201 via data bus 228E and to personal electronic device 203 at a USB communication adapter port 239 (e.g., a wired data communication port). Personal electronic device 203 includes a universal serial bus interface adapter (e.g., a wired communication adapter) to connect to adapter port 239. In this regard, personal electronic device 203 communicates with data transceiver 211A and/or data transceiver 211B over a wired data communication path including controller 201 and USB controller 231. In some embodiments, USB controller 231 includes an electrical charging adapter to electrically charge personal electronic device 203 when connected to adapter port 239. The USB communication interface discussed herein presents one non-limiting embodiment of a wired data communication interface, and it is understood other wired data communication interfaces between personal electronic device 203 and flight crew connectivity system 100 may be contemplated.

In one embodiment, flight crew connectivity system 100 includes secure digital (SD) card controller 232 to provide for a secure digital (SD) card 235 (e.g., secure data memory card) interface. SD card controller 232 provides for a data communication between flight crew personal electronic device 203 and SD card 235. In this regard, SD card controller 232 provides a communication interface to transmit and/or receive data between personal electronic device 203 and SD card 235.

In one embodiment, cellular transceiver 215 provides for a secure wireless communication interface between personal electronic device 203 and a cellular communication tower 237. In some embodiments, cellular transceiver 215 includes a subscriber identification module (SIM) 241 to securely store personal electronic device 203 subscriber identity. In this regard, cellular transceiver 215 provides a second secure wireless network 119 for secure communication between personal electronic device 203 and external cellular device 237A. In some embodiments, applications software is provided from an operator at a remote location via the second secure wireless network 119 to upload flight operations software (e.g., such as updates to existing flight operations software) to one or more of the avionics equipment 102 LRUs, such as the Flight Management Computer (FMC), for example. In this regard, the flight operations software includes a unique identifier within the software header to identify the particular LRU associated with the software, and the software is either manually or automatically loaded into the LRU. In various embodiments, avionics equipment 102 provides a discreet signal to cellular transceiver 215 to disable communication between personal electronic device 203 and external cellular device 237A when aircraft 101 is airborne.

Figure 3:
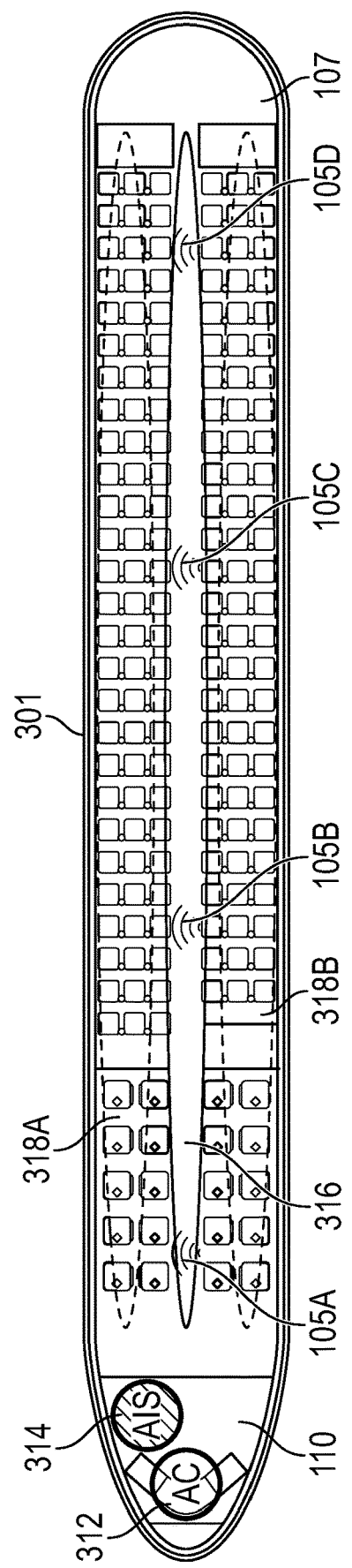
FIG. 3 illustrates various data domains within an aircraft fuselage in accordance with an embodiment of the disclosure.

FIG. 3 illustrates various data domains within an aircraft fuselage 301 in accordance with an embodiment of the disclosure. As illustrated in FIG. 3, aircraft fuselage 301 includes multiple aircraft data domains. For example, in some embodiments, fuselage 301 includes an aircraft control domain 312, an aircraft information systems domain 314, a passenger information and entertainment system domain 316, and a passenger owned devices domain 318A-B.

In various embodiments, aircraft regulations require separation of direct access between one or more of the above domains. For example, aircraft control domain 312 and aircraft information systems domain 314 require direct Ethernet connections be isolated from passenger information and entertainment system domain 316 and passenger owned devices domain 318A-B. In various embodiments, flight crew connectivity system 100 provides flight crew members dedicated and secure wireless access to one or more of these domains in flight deck 110 by physically isolating aircraft control domain 312 and/or aircraft information systems domain 314 from passenger information and entertainment system domain 316 and/or passenger owned devices domain 318A-B.

In some embodiments, avionics equipment 102 includes a Flight Management Computer (FMC), a Flight Data Acquisition Unit (DFDAU), a Display Process Computer (DPC), a Proximity Sensor Electronics Unit (PSEU), an Electronic Flight Bag (EFB), a Cabin Connectivity System (CCS), and an On-board Network System (ONS). The list is not exhaustive and, in other embodiments, fewer or more units (e.g., line replaceable units (LRUs)) may be included in avionics equipment 102. In some embodiments, non-avionics equipment 104 includes an In-Flight Entertainment and Connectivity System (IFEC) in communication with passenger owned devices domain 318 via less secure wireless access points (WAPs) 105A-D within aircraft cabin 107. The list of non-avionics equipment 104 and/or non-avionics features is not exhaustive and, in other embodiments, fewer or more units and/or features may be included.

Figure 4:
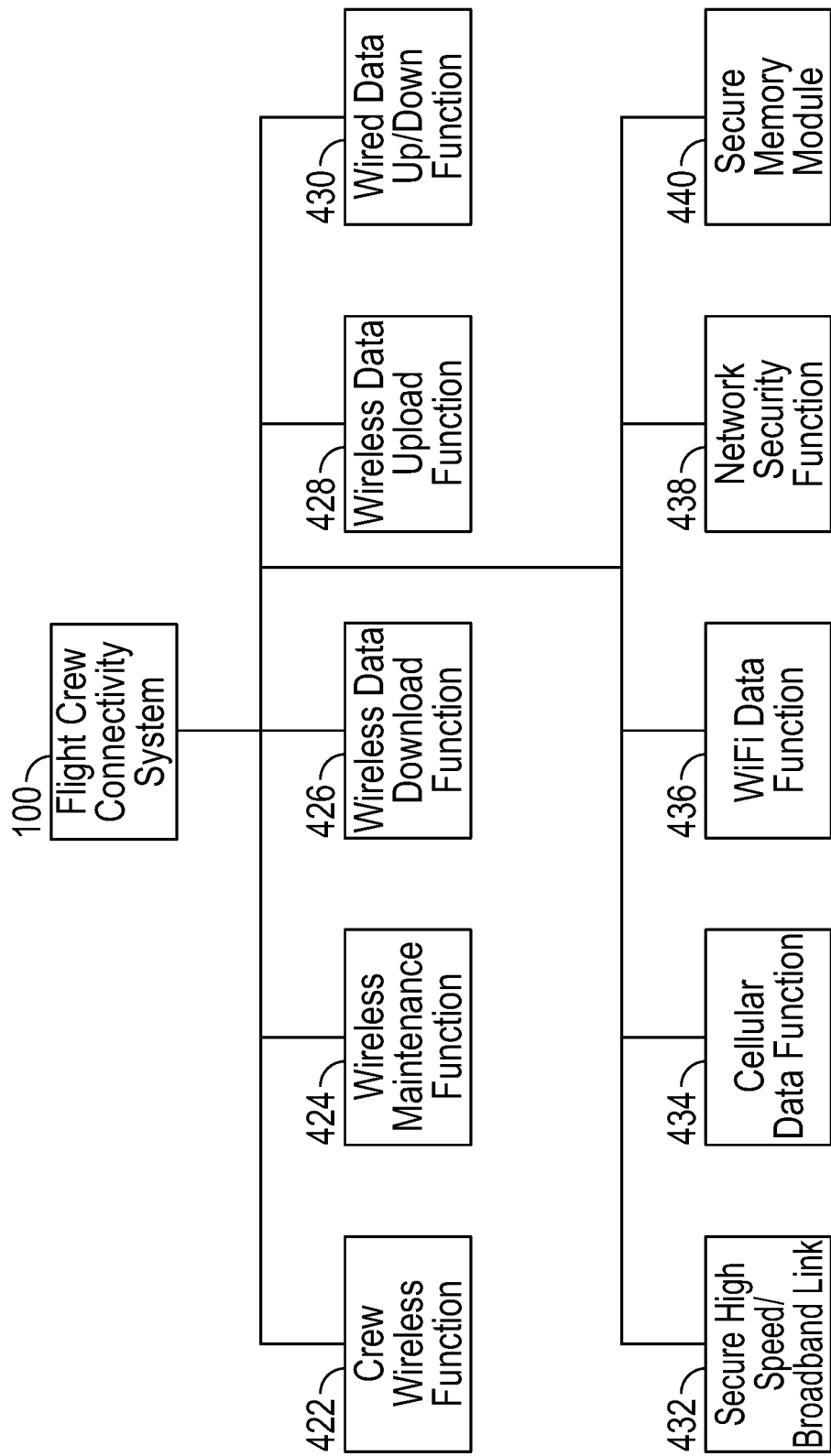
FIG. 4 illustrates various functions of a flight crew connectivity system in accordance with embodiments of the disclosure.

FIG. 4 illustrates various functions of a flight crew connectivity system 100 in accordance with embodiments of the disclosure. As illustrated, flight crew connectivity system 100 provides flight crew members with dedicated and secure wireless access to many functions included within domains 312, 314, 316, and 318 of aircraft 101.

For example, in some embodiments, a crew wireless function 422 provides for a dedicated Wi-Fi network for data access by personal electronic device 203 within aircraft 101 for flight crew use only. A wireless maintenance function 424 provides flight crew members with maintenance and troubleshooting data of aircraft systems over the flight crew dedicated Wi-Fi network 103A-C. A wireless data download function 426 provides for download of airplane and maintenance data from avionics equipment 102, such as ONS and DFDAU, to flight crew member's personal electronic device 203. In some embodiments, a wireless data upload function 428 provides for upload of flight plan information to the FMC and other data or information to various avionics equipment 102 from flight crew member's personal electronic device 203.

In some embodiments, a wired data up/down function 430 provides for a high speed wired USB connection to flight crew member's personal electronic device 203 for both upload and download tasks, and provides fast charging of personal electronic device 203 connected to adapter port 239 of USB controller 231. In some embodiments, a secure high speed/broadband link 432 provides flight crew member's personal electronic device 203 with a dedicated and secure high speed off-board link for download and upload of business and/or operational data. For example, flight crew member's personal electronic device 203 may be utilized for accessing weather data in anticipation of optimizing aircraft 101 flight route.

In some embodiments, a cellular data function 434 provides flight crew members with an alternate secure high speed off-board link for download and upload of operational and business data and loadable software, such as application software for business and/or flight operations loadable to personal electronic device 203. The cellular link is disabled while the aircraft is airborne to comply with regulatory agency requirements. A Wi-Fi data function 436 provides flight crew member's personal electronic device 203 with an alternate secure high speed offboard link for download and upload of business and operational data. A network security function 438 is implicit through the mutually exclusive access to aircraft control domain 312, aircraft information systems domain 314, passenger information and entertainment system domain 316 via domain switch 223. A secure memory module 440 provides for localized storage of operational data via secure digital card 235. Additional features may include, in some embodiments, near-field 213B and/or Bluetooth 213C wireless communication protocols used for communication between flight crew connectivity system 100 and personal electronic device 203.

Figure 5:
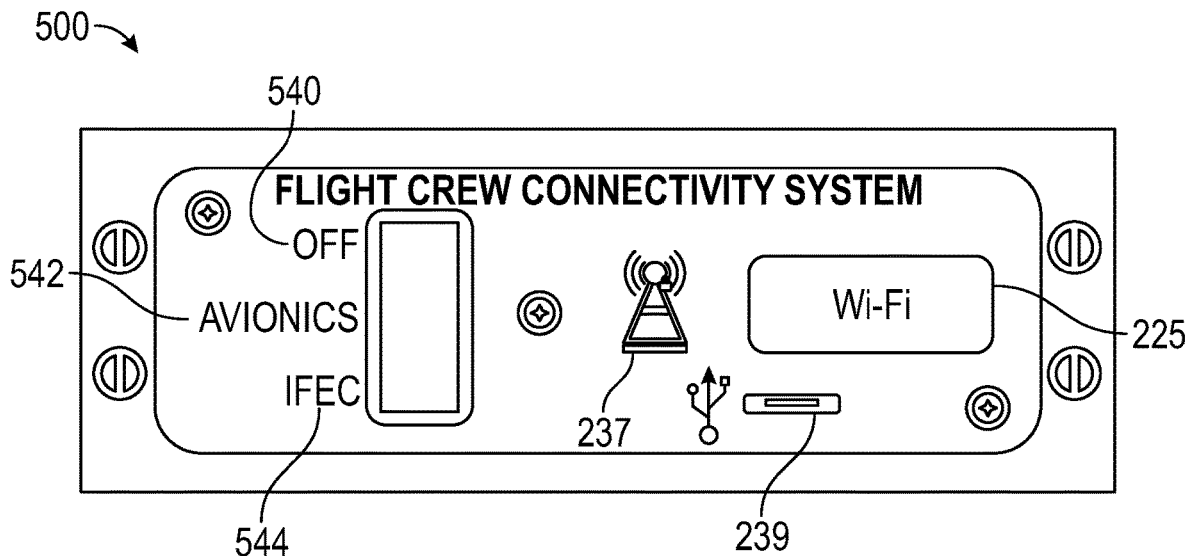
FIG. 5 illustrates a panel concept display for a flight crew connectivity system in accordance with embodiments of the disclosure.

FIG. 5 illustrates a panel concept display (or display panel) 500 for a flight crew connectivity system 100 in accordance with embodiments of the disclosure. In some embodiments, flight crew connectivity system 100 is a form fit for installation in a panel within flight deck 110, for example. In this regard, flight crew connectivity system 100 is intended to meet criteria specific to flight deck requirements, such as: switch types, switch positions, lights, colors, font, and symbols. Flight crew connectivity system 100 integrated control and operation are initiated via an ON/OFF switch 540 to enable or disable the system to broadcast its secure wireless signal, such as a Wi-Fi wireless signal from wireless data transceiver 213, for example. In some embodiments, display panel 500 includes an indicator light 225, implemented as a light emitting diode (LED), for visual indication that the system is turned on and transmitting. In other embodiments, indicator 225 is implemented as an audible signal or other type of indicator to inform an operator the system is turned on and transmitting. Another feature includes a multi-position switch to choose between avionics switch position 542 and IFEC switch position 544. The first switch position 540 would turn off flight crew connectivity system 100 to comply with regulations that may require non-flight critical devices to be turned off in the event of an emergency. Avionics switch position 542 (highest level of security), enables a link to aircraft avionics equipment 102 data, but does not allow the flight crew to access non-avionics equipment 104, such as the broadband SATCOM system. IFEC switch position 544 (lowest level of security), enables flight crew to access the IFEC for connection to broadband internet applications, and does not allow the flight crew to access avionics equipment 102.

In some embodiments, a fourth switch position is installed and is implemented by a rotary type switch, for example. The fourth switch position is used for loading aircraft control computers, such as wirelessly uploading a flight plan to the FMC from personal electronic device 203. In various embodiments, the fourth switch position is isolated from the other switch positions (e.g., switch positions 542 and/or 544) that link to avionics equipment 102 data and IFEC. In some embodiments, a USB adapter port 239 is installed with a wired data connection to provide a wired connection between flight crew connectivity system 100 and personal electronic device 203. In some embodiments, adapter port 239 is used to electrically charge personal electronic device 203. In some embodiments, flight crew connectivity system 100 includes cellular transceiver 215 including, for example, a 3*g*/4*g* cellular modem and SIM card 241, to allow personal electronic device 203 to communicate with a cellular mobile device via cellular tower 237, when aircraft 101 is on the ground.

Figure 6A:
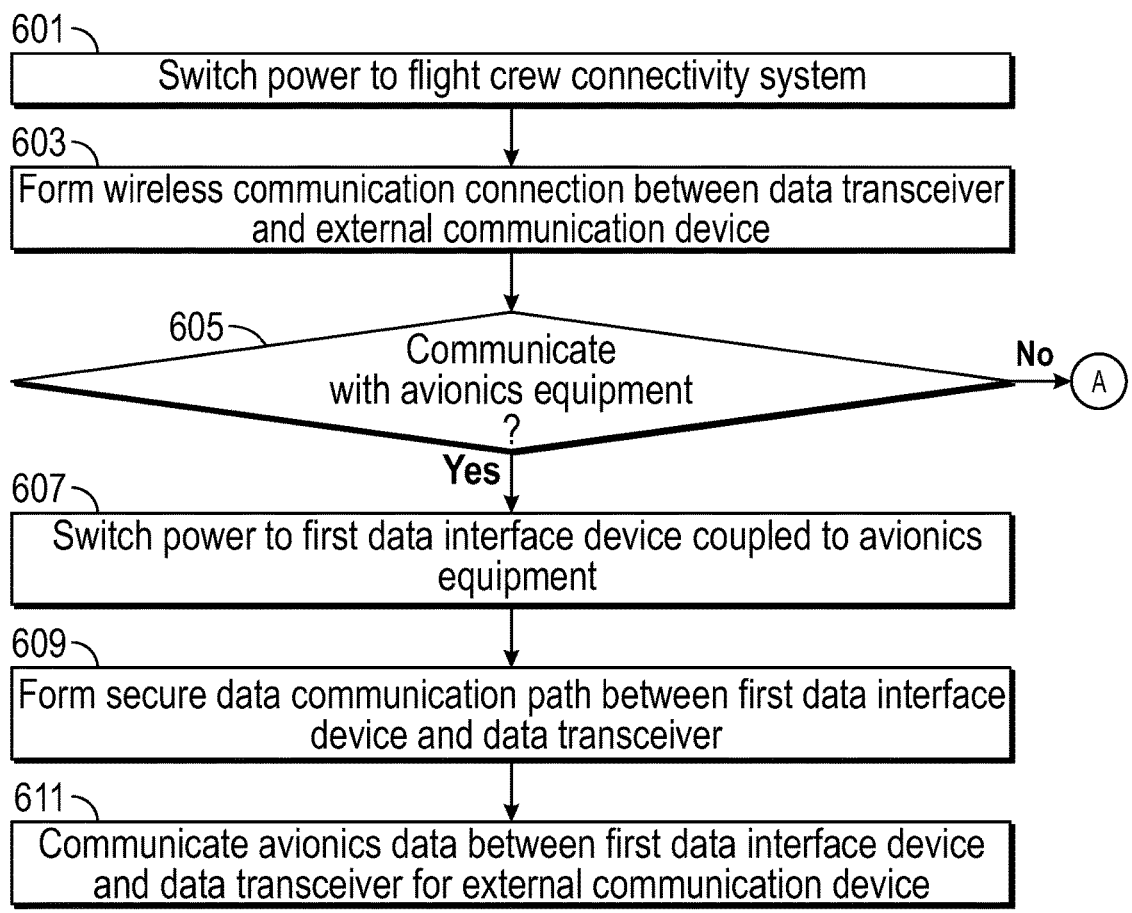
FIGS. 6A-B illustrate flow diagrams describing a method for using a flight crew connectivity system in accordance with an embodiment of the disclosure.
Figure 6B:
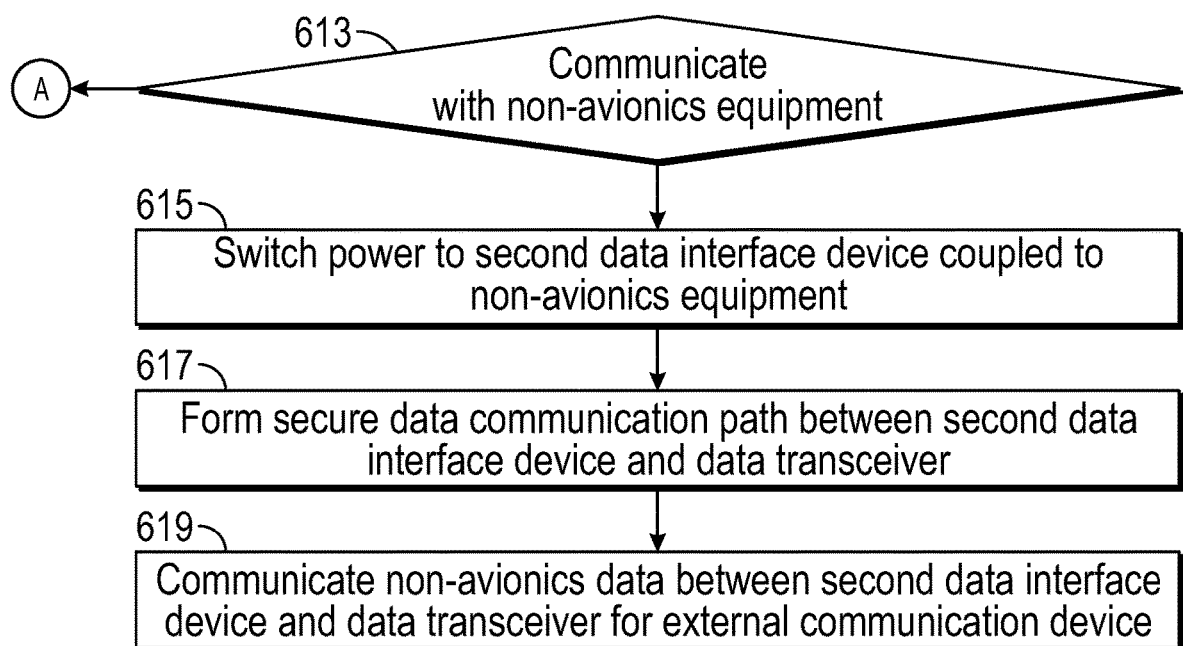

FIGS. 6A-B illustrate flow diagrams describing a method for using a flight crew connectivity system 100 in accordance with an embodiment of the disclosure.

In block 601, flight crew connectivity system 100 is powered on. In this regard, switch 540 on display panel 500 is used to switch power to flight crew connectivity system 100. Switch 540 on display panel 500 controls power switch 219 connected between aircraft power module 106 and flight crew connectivity system 100 to power on and power off flight crew connectivity system 100.

In block 603, after powering on, flight crew connectivity system 100 forms a wireless communication connection between data transceiver 213 and personal electronic device 203 (e.g., external communication device). In some embodiments, a secure Wi-Fi wireless interface 213A is used as a wireless connection between flight crew connectivity system 100 and flight crew personal electronic device 203. However, other secure wireless communication connections are possible, such as a secure near-field wireless communication connection 213B and/or a secure Bluetooth wireless communication connection 213C. In some embodiments, flight crew connectivity system 100 includes a dedicated and secure IEEE 802.11 service set identifier for airline proprietary login for flight crew use only.

In block 605, flight crew member determines whether to communicate with avionics equipment 102 or non-avionics equipment 104. In this regard, flight crew member selects avionics switch position 542 on display panel 500 to communicate with avionics equipment 102 or IFEC switch position 544 to communicate with non-avionics equipment 104.

In block 607, if flight crew member chooses avionics switch position 542, domain switch 223 is moved to first output terminal 223A to switch power to first data transceiver 211A (e.g., first data interface device) coupled to avionics equipment 102. Powered on data transceiver 211A receives data from avionics equipment 102 via data bus 221C implemented as an aircraft proprietary ARINC 429 data bus, an aircraft proprietary ARINC 717 data bus and/or an Ethernet interface. Data transceiver 211A may communicate with one or more units associated with avionics equipment 102, as discussed herein.

In block 609, controller 201 forms a secure data communication path between data transceiver 211A (e.g., first data interface device) and data transceiver 213 via data buses 228A and 228C. For example, domain switch 223 isolates power to data transceiver 211A only, while maintaining data transceiver 211B in an off state. Thus, communication between data transceiver 211A and avionics equipment 102 is isolated on data buses within flight crew connectivity system 100.

In block 611, flight crew connectivity system 100 provides for one or more units associated with avionics equipment 102 to securely communicate avionics data between data transceiver 211A (e.g., first data interface device) and data transceiver 213 for personal electronic device 203 (e.g., external communication device). In this regard, avionics equipment 102 is physically isolated on data buses 228A and 228C, and wireless communication connection between data transceiver 211A and personal electronic device 203 is a dedicated and secure IEEE 802.11 service set identifier (SSID) airline proprietary login for flight crew personal electronic device 203 use only.

In block 613, flight crew member selects IFEC switch position 544 on display panel 500 to communicate with non-avionics equipment 104.

In block 615, if flight crew member chooses IFEC switch position 544, domain switch 223 is moved to second output terminal 223B to switch power to data transceiver 211B (e.g., second data interface device) coupled to non-avionics equipment 104. Powered on data transceiver 211B receives data from non-avionics equipment 104 via data bus 221D implemented as an Ethernet data bus to complement Ethernet interface 115.

In block 617, controller 201 forms a secure data communication path between data transceiver 211B (e.g., second data interface device) and data transceiver 213 via data buses 228B and 228C. As discussed herein, domain switch 223 isolates power to data transceiver 211B only, while maintaining data transceiver 211A in an off state. Thus, communication between data transceiver 211B and non-avionics equipment 104 is isolated on data buses within flight crew connectivity system 100. In this regard, security is maintained for avionics equipment 102 within flight crew connectivity system 100.

In block 619, flight crew connectivity system 100 provides for one or more units associated with non-avionics equipment 104 to securely communicate non-avionics data between data transceiver 211B (e.g., second data interface device) and data transceiver 213 for personal electronic device 203 (e.g., external communication device). In this regard, non-avionics equipment 104 is physically isolated on data buses 228B and 228C, and wireless communication connection between data transceiver 211B and personal electronic device 203 is a dedicated and secure IEEE 802.11 service set identifier (SSID) airline proprietary login for flight crew personal electronic device 203 use only. Communication with non-avionics equipment 104 provides for flight crew members to access broadband internet on their personal electronic device 203 and/or communicate with external cellular users, for example.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable media. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A system comprising:
    two or more data interface devices configured to communicate data;
    a power module configured to provide power to the two or more data interface devices, wherein the two or more data interface devices comprise:
        a first data interface device configured to communicate with avionics equipment when the first data interface device is powered; and
        a second data interface device configured to communicate with non-avionics equipment when the second data interface device is powered;
    a switch coupled between the power module and each of the one two or more data interface devices and configured to selectively provide power from the power module to at least one of the two or more data interface devices;
    a data transceiver configured to couple to an external communication device; and
    a controller coupled between the two or more data interface devices and the data transceiver and configured to provide a data communication path between the selectively powered data interface device and the data transceiver for the external communication device, wherein:
        data from the avionics equipment is physically isolated on the data communication path when the first data interface device is powered and the second data interface device is unpowered; and
        data from the non-avionics equipment is physically isolated on the data communication path when the second data interface device is powered and the first data interface device is unpowered.

2. The system of claim 1, wherein
    the avionics equipment is configured to provide the data from the avionics equipment that includes aircraft control and aircraft information data, and
    wherein the non-avionics equipment is configured to provide the data from the non-avionics equipment that includes broadband internet access and/or passenger information and entertainment data.

3. The system of claim 2, wherein the aircraft control and aircraft information data is physically isolated on the data communication path when the first data interface device is powered and the second data interface device is unpowered, and wherein the broadband internet access and/or the passenger information and entertainment data is physically isolated on the data communication path when the second data interface device is powered and the first data interface device is unpowered.

4. The system of claim 2, wherein the data transceiver comprises a wireless data transceiver configured to provide a secure wireless communication network for the external communication device.

5. The system of claim 4, wherein the external communication device comprises one or more wireless smart devices configured to communicate with the wireless data transceiver via the secure wireless communication network.

6. The system of claim 5, further comprising a cellular transceiver comprising a second secure wireless communication network configured to communicate between the one or more wireless smart devices and an external cellular device, wherein the second secure wireless communication network is configured to communicate application software comprising business and/or flight operations to the one or more wireless smart devices and/or the avionics equipment.

7. The system of claim 2, wherein the external communication device is configured to communicate data to the avionics equipment via the data communication path when the first data interface device is powered, and wherein the avionics equipment is configured to communicate flight information to the external communication device via the data communication path when the first data interface device is powered.

8. The system of claim 1, further comprising a universal serial bus controller coupled to the controller configured to provide a wired data communication path for the external communication device, wherein the external communication device comprises a wired communication adapter configured to couple to a universal serial bus controller data communication port to form the wired data communication path.

9. The system of claim 8, wherein the universal serial bus controller further comprises an electrical charging adapter configured to electrically charge the external communication device coupled to the data communication port, and further comprising a secure digital card controller configured to communicate between a secure data memory card and the external communication device to provide for secure data storage within the secure data memory card.

10. A method comprising:
    selectively switching power from a power module to at least one of two or more data interface devices to selectively power the at least one data interface device, wherein the two or more data interface devices comprise:
        a first data interface device configured to communicate with avionics equipment when the first data interface device is powered; and
        a second data interface device configured to communicate with non-avionics equipment when the second data interface device is powered;
    forming a data communication path between the selectively powered data interface device and a data transceiver, wherein:
        data from the avionics equipment is physically isolated on the data communication path when the first data interface device is powered and the second data interface device is unpowered; and
        data from the non-avionics equipment is physically isolated on the data communication path when the second data interface device is powered and the first data interface device is unpowered; and communicating data between the selectively powered data interface device and the data transceiver for an external communication device.

11. The method of claim 10, wherein
the avionics equipment is configured to provide the data from the avionics equipment that includes aircraft control and aircraft information data; and
the non-avionics equipment is configured to provide the data from the non-avionics equipment that includes broadband internet access and/or passenger information and entertainment data, the method further comprising:
identifying the selectively powered data interface device; and
communicating the identified selectively powered data interface device to the external communication device.

12. The method of claim 11, wherein communicating data further comprises:
communicating data between the first data interface device and the avionics equipment when the first data interface device is powered; and
communicating data between the second data interface device and the non-avionics equipment when the second data interface device is powered.

13. The method of claim 11, further comprising:
physically isolating the aircraft control and aircraft information data on the data communication path when the first data interface device is powered and the second data interface device is unpowered, and
physically isolating the broadband internet access and/or the passenger information and entertainment data on the data communication path when the second data interface device is powered and the first data interface device is unpowered.

14. The method of claim 10, wherein the data transceiver comprises a wireless data transceiver, and wherein communicating data further comprises forming a secure wireless communication network for the external communication device.

15. The method of claim 14, wherein the external communication device comprises one or more wireless smart devices, and wherein communicating data further comprises communicating data between the one or more wireless smart devices and the wireless data transceiver via the secure wireless communication network.

16. The method of claim 15, further comprising a cellular transceiver comprising a second secure wireless communication network coupled to the wireless data transceiver, wherein forming a data communication path further comprises forming a second data communication path between the one or more wireless smart devices and an external cellular device via the second secure wireless communication network, and wherein the second secure wireless communication network is configured to communicate application software comprising business and/or flight operations to the one or more wireless smart devices and/or avionics equipment.

17. The method of claim 10, further comprising a universal serial bus controller configured to provide a wired communication path, wherein the external communication device comprises a wired communication adapter configured to couple to a universal serial bus controller data communication port, wherein the communicating data further comprises communicating via the data communication port for the external communication device, and wherein the method further comprises charging the external communication device coupled to the universal serial bus controller via the data communication port, and the communicating further comprises communicating data between a secure data memory card and the external communication device to provide for secure data storage within the secure data memory card.

18. An aircraft comprising the system of claim 1, wherein the aircraft comprises:
avionics equipment;
non-avionics equipment;
a power source configured to provide power; and
a power source switch coupled between the power source and the power module configured to selectively switch power from the power source to the power module.

19. A method of using the system of claim 2, the method comprising:
selectively switching power from the power module to the at least one of the one or more first and second data interface devices;
coupling the first data interface device to the avionics equipment when the first data interface device is powered;
coupling the second data interface device to the non-avionics equipment when the second data interface device is powered;
forming the data communication path between the powered data interface device and the data transceiver;
validating a security level of the external communication device; and
communicating the data between the powered data interface device and the data transceiver for the external communication device.

20. A method of incorporating the system of claim 1 into an aircraft, the method comprising:
installing the one or more data interface devices, the power module, the controller, and the data transceiver, wherein the controller is coupled between the one or more data interface devices and the data transceiver; and
coupling the switch between the power module and each of the one or more data interface devices.

* * * * *